(12) United States Patent
Eo et al.

(10) Patent No.: US 7,428,563 B2
(45) Date of Patent: Sep. 23, 2008

(54) APPARATUS AND METHOD FOR SELECTIVELY PERFORMING FAST HADAMARD TRANSFORM OR FAST FOURIER TRANSFORM

(75) Inventors: Ik-Soo Eo, Daejeon (KR); Young-Seok Baek, Daejeon (KR); Jung-Bum Kim, Daejeon (KR); Hee-Bum Jung, Daejeon (KR); Kyung-Soo Kim, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 638 days.

(21) Appl. No.: 10/969,504

(22) Filed: Oct. 19, 2004

(65) Prior Publication Data

US 2005/0144209 A1   Jun. 30, 2005

(30) Foreign Application Priority Data

Dec. 27, 2003   (KR) .................... 10-2003-0098222

(51) Int. Cl.
*G06F 17/14* (2006.01)
(52) U.S. Cl. ..................................... 708/404
(58) Field of Classification Search ................. 708/404
See application file for complete search history.

(56) References Cited

U.S. PATENT DOCUMENTS

| 5,561,618 | A | | 10/1996 | Dehesh |
| 5,818,742 | A | * | 10/1998 | Fraenkel et al. ............. 708/400 |
| 6,356,926 | B1 | | 3/2002 | Andre |

OTHER PUBLICATIONS

"A New Approach to Pipeline FFT Processor", S. He, et al, Proceedings of IPPS '96, 1996 IEEE, pp. 766-770.
"An Efficient Memory-Based FFt Architecture", C. Chang, et al, 2003 IEEE, pp. 129-132.

* cited by examiner

*Primary Examiner*—Tan V Mai
(74) *Attorney, Agent, or Firm*—Blakely, Sokoloff, Taylor & Zafman

(57) ABSTRACT

Disclosed is an apparatus for performing both FHT (Fast Hadamard Transform) and FFT (Fast Fourier Transform). This apparatus determines the phase coefficients as constantly "1" when performing the FHT, and changes the input order of input data to a reverse order of bits when performing the FFT. In addition, the apparatus, which can process a plurality of input data sets simultaneously, classifies the received signals into multi-path signals and multi-antenna signals, thus processing the multi-path signals separately from the multi-antenna signals, or directly processes multi-antenna signals.

17 Claims, 9 Drawing Sheets

APPARATUS AND METHOD FOR SELECTIVELY PERFORMING FAST HADAMARD TRANSFORM OR FAST FOURIER TRANSFORM

CROSS REFERENCE TO RELATED APPLICATION

This application claims priority to and the benefit of Korea Patent Application No. 2003-98222 filed on Dec. 27, 2003 in the Korean Intellectual Property Office, the entire content of which is incorporated herein by reference.

BACKGROUND OF THE INVENTION (a) Field of the Invention

The present invention relates to an apparatus and method for performing fast transform at the receiver of a communication system.

(b) Description of the Related Art

In general, the receiver of CDMA (Code Division Multiple Access) communication systems employs the FHT (Fast Hadamard Transform) method so as to demodulate the modulated signals from a mobile station. Namely, a IS95 CDMA base station, upon receiving backward transmit signals, performs the FHT method to demodulate the FHT-modulated signals from the mobile station by using one of 64 Hadamard orthogonal codes according to the 6-bit information of the mobile station user used as an indicator. In this way, the receiver of the CDMA communication systems can receive the signals efficiently.

The receiver of OFDM (Orthogonal Frequency Division Multiplexing) communication systems demodulates FFT-modulated signals from the mobile station by the FFT method. In this way, the receiver of the OFDM communication systems can receive the signals efficiently.

However, the FHT receiver has a different structure from the FFT receiver, so each of the receivers is to be implemented in separate hardware specifically by the communication systems.

SUMMARY OF THE INVENTION

It is an advantage of the present invention to provide an apparatus for selectively performing FFT or FHT.

It is another advantage of the present invention to provide a receiver for simultaneously processing signal components provided by multiple paths.

It is still another advantage of the present invention to provide a receiver for efficiently receiving multi-antenna input signals.

To achieve the advantages, the present invention enables either FHT or FFT in one apparatus.

In one aspect of the present invention, there is provided an apparatus that selectively performs FHT or FFT and includes at least one memory. The apparatus includes: a subtractor for performing a subtraction of a final output of the memory and input data; a multiplier for multiplying an output of the subtractor by a phase coefficient; a first multiplexer for selectivity outputting an output of the multiplier and the input data and storing the output data in the memory; an adder for performing an addition of the final output of the memory and the input data; and a second multiplexer for selectively outputting an output of the adder or the final output of the memory. The phase coefficient is determined as "1" when the apparatus performs the FHT.

The apparatus further includes: an input buffer for, when the apparatus performs the FFT, changing an input order of the original input data to a reverse order of bits and outputting the input data in the reverse order of bits. The apparatus also further includes: an output buffer for, when the apparatus performs the FFT, changing an output order of the output data to a reverse order of bits and providing the output data in the reverse order of bits.

When the apparatus performs $2^n$ (wherein n is an integer from 1 to N)-order conversion in $2^N$-order conversion, the at least one memory sequentially stores $2^{n-1}$ outputs of the first multiplexer and sequentially outputs the stored data.

When the apparatus performs $2^n$ (wherein n is an integer from 1 to N)-order conversion in $2^N$-order conversion and processes k (wherein k is an integer from 1) sets of input data simultaneously, the at least one memory sequentially stores $2^{n-1} \cdot k$ outputs of the first multiplexer and sequentially outputs the stored data.

In response to a first selection signal, the first multiplexer outputs the input data, and the second multiplexer outputs the final output of the memory. In response to a second selection signal, the first multiplexer outputs the output of the multiplier, and the second multiplexer outputs the output of the adder. The first and second selection signals are transformed in synchronization with k input sets of the $2^{n-1}$ input data.

When the apparatus performs the FFT, the input data are input in the same order as an original input order. The apparatus further includes: an output buffer for changing the output order of the output data to a reverse order of bits and outputting the output data in the reverse order of bits.

When the apparatus performs $2^n$ (wherein n is an integer from 1 to N)-order conversion in $2^N$-order conversion and processing k (wherein k is an integer from 1) sets of input data simultaneously, the at least one memory sequentially stores $2^{N-n} \cdot k$ outputs of the first multiplexer and sequentially outputs the stored data.

In another aspect of the present invention, there is provided an apparatus that receives input data and provides output data by selectively performing the FHT or the FFT. The apparatus includes: a first converter for processing the input data and data obtained by delaying the input data by a first period, by the FHT or the FFT depending on a first phase coefficient; a second converter for processing an output of the first converter and data obtained by delaying the output of the first converter by a second period, by the FHT or the FFT depending on a second phase coefficient; and a buffer for receiving the input data and outputting the received data. The first and second converters perform the FHT, when the first and second phase coefficients are constantly "1". The buffer changes an input order of the input data to a reverse order of bits and sends the input data in the reverse order of bits to the first converter, when the first and second converters perform the FFT.

The second period is double the first period.

In another aspect of the present invention, there is provided an apparatus for selectively performing FHT or FFT that includes: a first converter for processing the input data and data obtained by delaying the input data by a first period, by the FHT or the FFT depending on a first phase coefficient; and a second converter for processing an output of the first converter and data obtained by delaying the output of the first converter by a second period, by the FHT or the FFT depending on a second phase coefficient. The first and second converters perform the FHT when the first and second phase coefficients are constantly "1". The output data of the FFT or the FHT are changed in output order thereof to a reverse order of bits and outputted in the reverse order of bits.

The second period is double the first period.

In still another aspect of the present invention, there is provided a method for selectively performing FHT or FFT. The method includes: (a) receiving input data; (b) subtracting the input data from delayed data; (c) multiplying the subtracted data by a phase coefficient; (d) selecting the input data or the multiplied data; (e) delaying the selected data by a predetermined period and providing the delayed data; (f) summating the delayed data and the input data; and (g) selecting either the delayed data or the addition data and providing the selected data as output data. The phase coefficient is determined as "1" constantly, when the FHT is performed. Alternatively, the phase coefficient is determined as a coefficient variable depending on a conversion order of the FFT, when the FFT is performed.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive. To clarify the present invention, parts which are not described in the specification are omitted, and parts for which similar descriptions are provided have the same reference numerals.

Hereinafter, a detailed description will be given as to an apparatus and method for selectively performing FHT or FFT according to an embodiment of the present invention with reference to the accompanying drawings.

The present invention finds out the similarity between the conventional FHT and FFT structures according to an analysis of the two structures, and suggests a receiver implementing both the two structures on the basis of the similarity.

Figure 1:
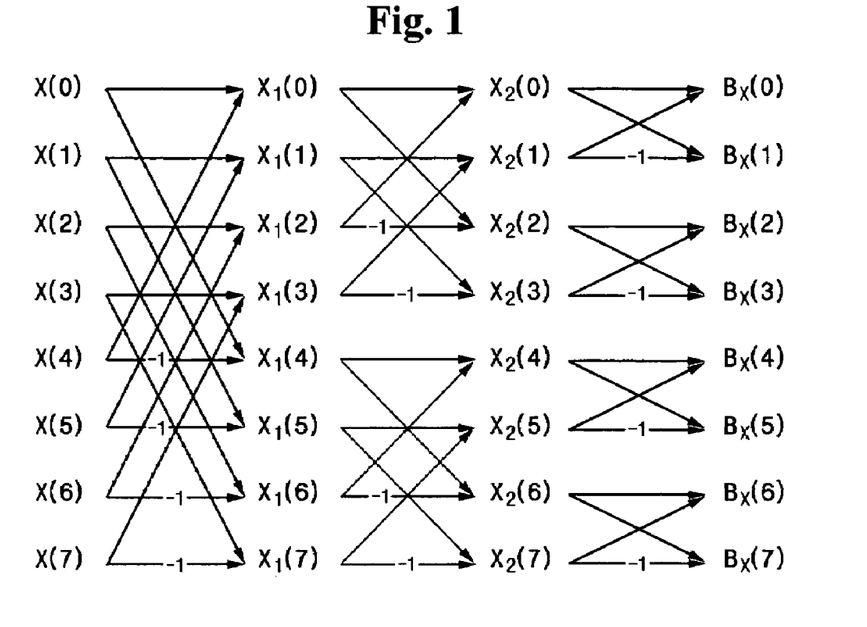
FIG. 1 is an illustration of a $2^3$-order FHT process.

Reference will be made to FIG. 1 to describe a general FHT signal processing method. FIG. 1 is an illustration of a $2^3$-order FHT process. FIG. 1 and Equations 1 to 8 exemplify a $2^3$-order FHT process.

Generally, Hadamard codes are generated by repetition of matrix $H_h(k)$ of the Equation 1 as expressed by the following Equation 2.

$$H_h(k) = \begin{bmatrix} H_h(k-1) & H_h(k-1) \\ H_h(k-1) & -H_h(k-1) \end{bmatrix} \quad \text{[Equation 1]}$$

$$H_h(0) = 1, \quad \text{[Equation 2]}$$

$$H_h(1) = \begin{bmatrix} 1 & 1 \\ 1 & -1 \end{bmatrix},$$

$$H_h(2) = \begin{bmatrix} 1 & 1 & 1 & 1 \\ 1 & -1 & 1 & -1 \\ 1 & 1 & -1 & -1 \\ 1 & -1 & -1 & 1 \end{bmatrix},$$

$$H_h(3) = \begin{bmatrix} 1 & 1 & 1 & 1 & 1 & 1 & 1 & 1 \\ 1 & -1 & 1 & -1 & 1 & -1 & 1 & -1 \\ 1 & 1 & -1 & -1 & 1 & 1 & -1 & -1 \\ 1 & -1 & -1 & 1 & 1 & -1 & -1 & 1 \\ 1 & 1 & 1 & 1 & -1 & -1 & -1 & -1 \\ 1 & -1 & 1 & -1 & -1 & 1 & -1 & 1 \\ 1 & 1 & -1 & -1 & -1 & -1 & 1 & 1 \\ 1 & -1 & -1 & 1 & -1 & 1 & 1 & -1 \end{bmatrix}$$

Every time the input signal X is applied to the $2^3$-order Hadamard code $H_h(3)$, the output signal $B_x$ from the Hadamard code $H_h(3)$ is given according to the Equation 3, which can be rewritten as the Equation 4.

$$B_x = H_h(3)X \quad \text{[Equation 3]}$$

$$\begin{bmatrix} B_x(0) \\ B_x(1) \\ B_x(2) \\ B_x(3) \\ B_x(4) \\ B_x(5) \\ B_x(6) \\ B_x(7) \end{bmatrix} = \begin{bmatrix} H_h(2) & H_h(2) \\ H_h(2) & -H_h(2) \end{bmatrix} \begin{bmatrix} X(0) \\ X(1) \\ X(2) \\ X(3) \\ X(4) \\ X(5) \\ X(6) \\ X(7) \end{bmatrix} \quad \text{[Equation 4]}$$

A computation of the Equation 4 provides the following Equation 5.

$$\begin{bmatrix} B_x(0) \\ B_x(1) \\ B_x(2) \\ B_x(3) \end{bmatrix} = H_h(2) \begin{bmatrix} X_1(0) \\ X_1(1) \\ X_1(2) \\ X_1(3) \end{bmatrix} \quad \text{[Equation 5]}$$

-continued $$\begin{bmatrix} B_x(4) \\ B_x(5) \\ B_x(6) \\ B_x(7) \end{bmatrix} = H_h(2) \begin{bmatrix} X_1(4) \\ X_1(5) \\ X_1(6) \\ X_1(7) \end{bmatrix}$$

$X_1(l) = X(l) + X(l+4),\ l = 0, 1, 2, 3$ $X_1(l) = X(l-4) - X(l),\ l = 4, 5, 6, 7$

Expressing $H_h(2)$ in terms of $H_h(1)$, the Equation 5 can be rewritten as the following Equation 6.

$$\begin{bmatrix} B_x(0) \\ B_x(1) \\ B_x(2) \\ B_x(3) \end{bmatrix} = \begin{bmatrix} H_h(1) & H_h(1) \\ H_h(1) & -H_h(1) \end{bmatrix} \begin{bmatrix} X_1(0) \\ X_1(1) \\ X_1(2) \\ X_1(3) \end{bmatrix}$$ [Equation 6]

$$\begin{bmatrix} B_x(4) \\ B_x(5) \\ B_x(6) \\ B_x(7) \end{bmatrix} = \begin{bmatrix} H_h(1) & H_h(1) \\ H_h(1) & -H_h(1) \end{bmatrix} \begin{bmatrix} X_1(4) \\ X_1(5) \\ X_1(6) \\ X_1(7) \end{bmatrix}$$

The Equation 6 can also be expressed as the following Equation 7.

$$\begin{bmatrix} B_x(0) \\ B_x(1) \end{bmatrix} = H_h(1) \begin{bmatrix} X_2(0) \\ X_2(1) \end{bmatrix}$$ [Equation 7]

$$\begin{bmatrix} B_x(2) \\ B_x(3) \end{bmatrix} = H_h(1) \begin{bmatrix} X_2(2) \\ X_2(3) \end{bmatrix}$$

$$\begin{bmatrix} B_x(4) \\ B_x(5) \end{bmatrix} = H_h(1) \begin{bmatrix} X_2(4) \\ X_2(5) \end{bmatrix}$$

$$\begin{bmatrix} B_x(6) \\ B_x(7) \end{bmatrix} = H_h(1) \begin{bmatrix} X_2(6) \\ X_2(7) \end{bmatrix}$$

$X_2(l) = X_1(l) + X_1(l+2),\ l = 0, 1, 4, 5$ $X_2(l) = X_1(l-2) - X_1(l),\ l = 2, 3, 6, 7$

The Equation 7 can be rewritten as the following Equation 8.

$B_x(0) = X_2(0) + X_2(1)$ $B_x(1) = X_2(0) - X_2(1)$ $B_x(2) = X_2(2) + X_2(3)$ $B_x(3) = X_2(2) - X_2(3)$ $B_x(4) = X_2(4) + X_2(5)$ $B_x(5) = X_2(4) - X_2(5)$ $B_x(6) = X_2(6) + X_2(7)$ $B_x(7) = X_2(6) - X_2(7)$ [Equation 8]

The process of converting the input signal (X) to $X_1$, $X_2$ and $B_x$ according to the Equations 4 to 8 is illustrated in FIG. 1.

Figure 2:
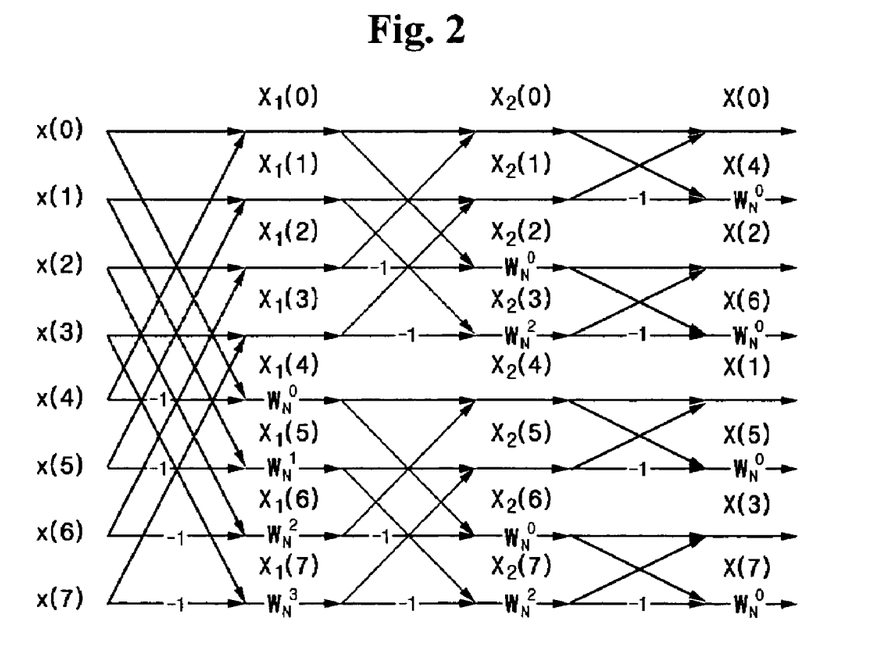
FIG. 2 is an illustration of a $2^3$-order FFT process.

Reference will be made to FIG. 2 to describe a general FFT process. FIG. 2 illustrates a $2^3$-order FFT process;

The output signal X obtained from the input signal x by FFT is typically given by the following Equation 9.

$$X(k) = \sum_{n=0}^{(N/2)-1} x(n)W_N^{nk} + \sum_{n=N/2}^{N-1} x(n)W_N^{nk}$$ [Equation 9]

Here, $W_N^{(n+N/2)k} = W_N^{nk} \cdot (-1)^k,$ so the Equation 9 can be rewritten as the following Equation 10.

$$X(k) = \sum_{n=0}^{(N/2)-1} \left[x(n) + (-1)^k x\left(n + \frac{N}{2}\right)\right] W_N^{nk}$$ [Equation 10]

The Equation 10 can be rewritten as the following Equation 11 for even number k and odd number k.

$$X(2r) = \sum_{n=0}^{(N/2)-1} \left[x(n) + x\left(n + \frac{N}{2}\right)\right] W_N^{2rn}$$ [Equation 11]

$$X(2r+1) = \sum_{n=0}^{(N/2)-1} \left[x(n) + x\left(n + \frac{N}{2}\right)\right] W_N^n W_N^{2rn}$$

$r = 0, 1, \ldots, (N/2 - 1)$

As can be seen from the Equation 11, N times of FFT is the same as N/2 times of FFT. The repetition of this procedure results in the $2^3$-order FFT process illustrated in FIG. 2.

Referring to FIGS. 1 and 2, the FHT process is similar to the FFT process. Unlike the FHT process of FIG. 1, the FFT process involves a different output order, which is determined by the reverse order of bits. Hence, it has only to reverse the order of bits in the input signal to be FFT-processed or the order of bits in the FFT-processed output signal. In the $2^3$-order FFT, for example, the first one "000", the third one "010", the sixth one "101" and the eighth one "111" of eight input data are not changed in order, but the second data "001" is moved to the fifth one "100", the fourth data "011" to the seventh one "110", the fifth data "100" to the second one "001", the seventh data "110" to the fourth one "011". Accordingly, the FHT and the FFT involve the same calculations, except for the step of multiplication by a coefficient, as can be seen from FIGS. 1 and 2.

As described above, the FHT process is similar to the FFT process. Hence, the present invention suggests an apparatus for selectively performing FHT or FFT based on that similarity.

A description will be given as to a receiver for both FHT and FFT according to a first embodiment of the present invention with reference to FIGS. 3, 4 and 5. Expediently, the process for $2^3$-order signal processing is exemplified in FIGS. 3, 4 and 5.

Figure 3:
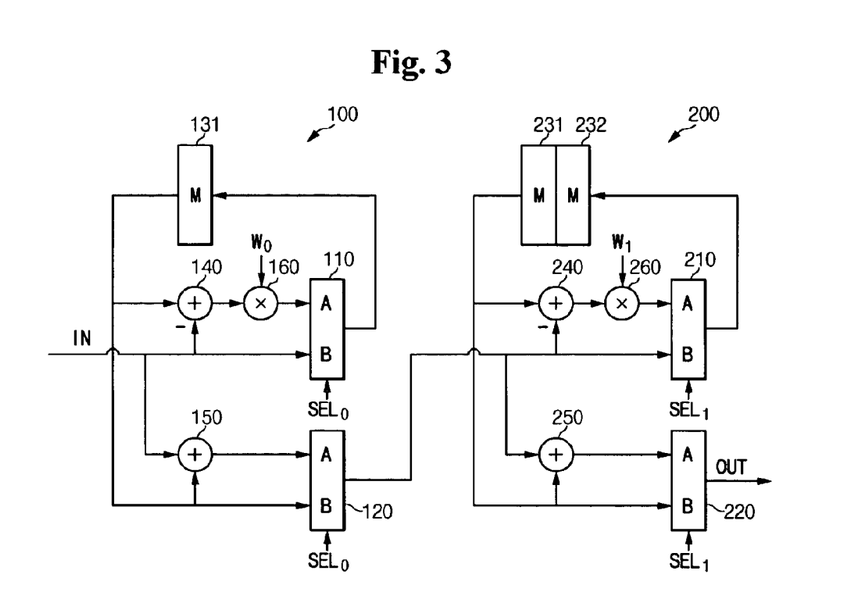
FIG. 3 is a schematic of an apparatus for selectively performing FHT or FFT according to a first embodiment of the present invention.

FIG. 3 is a schematic of an apparatus for selectively performing FHT or FFT according to the first embodiment of the present invention.

The apparatus according to the first embodiment of the present invention comprises, as shown in FIG. 3, a first signal processor 100, and a second signal processor 200. The first signal processor 100 comprises multiplexers 110 and 120 each having two inputs A and B, a memory 131 storing one input signal, a subtractor 140, an adder 150, and a multiplier 160. The second signal processor 200 comprises multiplexers 210 and 220 each having two inputs A and B, memories 231 and 232 each storing one input signal, a subtractor 240, an adder 250, and a multiplier 260. The output signal of the first signal processor 100 becomes the input signal of the second signal processor 200. The outputs of the multiplexers 120 and 220 become the outputs of the first and second signal processors 100 and 200, respectively.

In the first signal processor 100, the input signal $IN_1$ is fed to the input B of the multiplexer 110, and the output signal of the multiplier 160 is fed to the input A of the multiplexer 110. The subtractor 140 subtracts the input signal $IN_1$ from the output signal of the memory 131. The multiplier 160 multiplies the output signal of the subtractor 140 by a phase coefficient $W_0$. The output signal of the adder 150 is fed to the input A of the multiplexer 120, and the output signal of the memory 131 is fed to the input B of the multiplexer 120. The adder 150 summates the output signal of the memory 131 and the input signal $IN_1$. The memory 131 temporarily stores the output signal of the multiplexer 110 and outputs the stored signal.

Likewise, in the second signal processor 200, the output signal of the first signal processor 100, i.e., the output signal of the multiplexer 120 is fed to the input B of the multiplexer 210, and the output signal of the multiplier 260 is fed to the input A of the multiplexer 210. The subtractor 240 subtracts the output signal of the multiplexer 120 from the output signal of the memory 231. The multiplier 260 multiplies the output signal of the subtractor 240 by a phase coefficient $W_1$. The output signal of the adder 250 is fed to the input A of the multiplexer 220, and the output signal of the memory 231 is fed to the input B of the multiplexer 220. The adder 250 summates the output signal of the memory 231 and the output signal of the multiplexer 120. The memory 231 temporarily stores the output signal of the memory 232 and outputs the stored signal. The memory 232 temporarily stores the output signal of the multiplexer 210 and sends the stored signal to the memory 231.

The FHT and FFT methods of the apparatus will be described below with reference to FIGS. 4 and 5, respectively.

Figure 4:
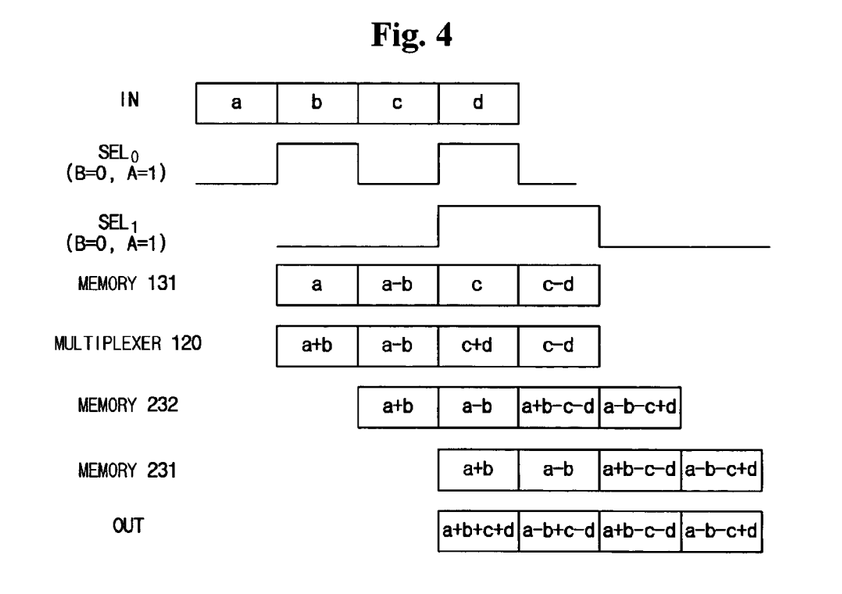
FIG. 4 is a waveform diagram in the FHT process of the apparatus of FIG. 3.
Figure 5:
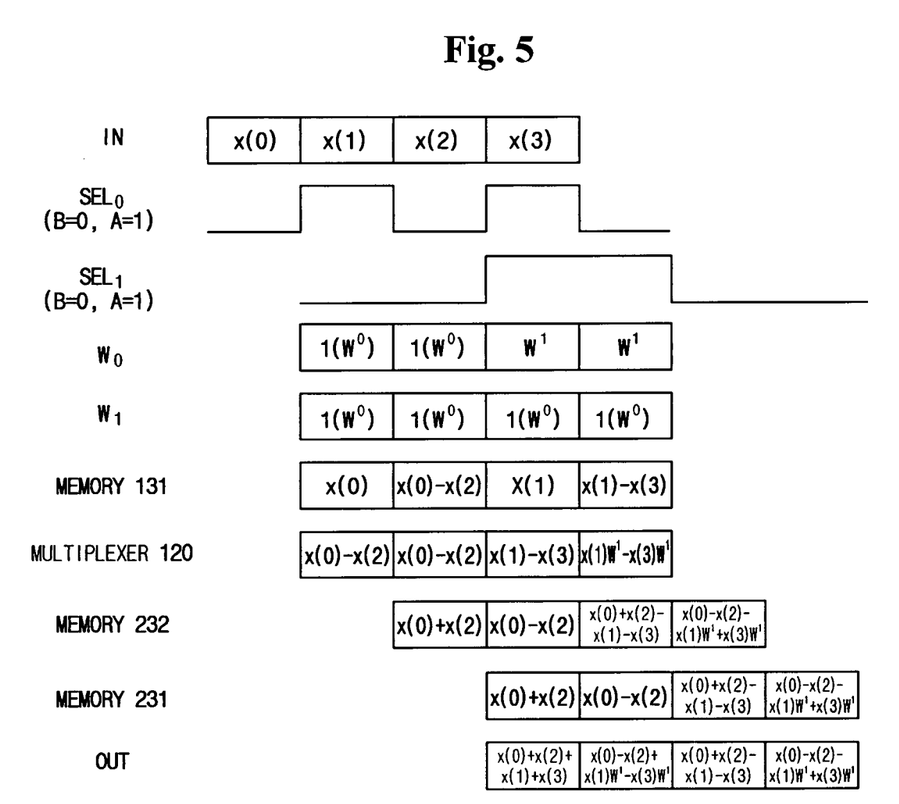
FIG. 5 is a waveform diagram in the FFT process of the apparatus of FIG. 3.

FIG. 4 is a waveform diagram in the FHT process of the apparatus of FIG. 3, and FIG. 5 is a waveform diagram in the FFT process of the apparatus of FIG. 3.

First, reference will be given to FIG. 4 to describe the FHT process of the apparatus of FIG. 3. When the apparatus of FIG. 3 performs a FHT process, the phase coefficients $W_0$ and $W_1$ are constantly "1", and hence, the multipliers 160 and 260 output the input signal without changing the order. In FIG. 4, the input signal has data "a", "b", "c", and "d" in sequence. The inputs A and A of the multiplexers 110 and 120 are selected in response to a selection signal $SEL_0$ that is "high", whereas the inputs B and B of the multiplexers 110 and 120 are selected in response to the selection signal $SEL_0$ that is "low". Likewise, the inputs A and A of the multiplexers 110 and 120 are selected in response to a "high" selection signal $SEL_0$, and the inputs B and B of the multiplexers 110 and 120 are selected in response to a "low" selection signal $SEL_0$.

First, the input signal IN having data "a" is fed to the first signal processor 100, and the input B of the multiplexer 110 is selected. The data "a" are stored in the memory 131.

The input signal IN is now for the data "b". The inputs A and A of the multiplexers 110 and 120 and the inputs B and B of the multiplexers 210 and 220 are selected. Then, the data "a+b" obtained by summating the input data "b" and the output data "a" of the memory 131 is output through the input A of the multiplexer 120. The data "a−b" obtained by subtracting the input data "b" from the output data "a" of the memory 131 is output through the input A of the multiplexer 110 and stored in the memory 131. The output data "a+b" of the multiplexer 120 are stored in the memory 232 via the input B of the multiplexer 210.

Subsequently, the input signal IN is for the data "c". The inputs B and B of the multiplexers 110 and 120 and the inputs B and B of the multiplexers 210 and 220 are selected. Then, the output data "a−b" of the memory 131 are output through the input B of the multiplexer 120, and the input data "c" are stored in the memory 131 via the input B of the multiplexer 110. The output data "a+b" of the memory 232 are stored in the memory 231, and the output data "a−b" of the multiplexer 120 are stored in the memory 232 via the input B of the multiplexer 210.

The input signal IN is for the data "d". The inputs A and A of the multiplexers 110 and 120 and the inputs A and A of the multiplexers 210 and 220 are selected. Then, the data "c+d" obtained by summating the input data "d" and the output data "c" of the memory 131 are output through the input A of the multiplexer 120. The data "c−d" obtained by subtracting the input data "d" from the output data "c" of the memory 131 are output through the input A of the multiplexer 110 and stored in the memory 131. The data "a+b−c−d" obtained by subtracting the output data "c+d" of the multiplexer 120 from the output data "a+b" of the memory 131 are stored in the memory 232 via the input A of the multiplexer 210. The data "a+b+c+d" obtained by summating the output data "c+d" of the multiplexer 120 and the output data "a+b" of the memory 231 are applied to the output data OUT via the input A of the multiplexer 220. The output data "a−b" of the memory 232 are stored in the memory 231.

The inputs B and B of the multiplexers 110 and 120 and the inputs A and A of the multiplexers 210 and 220 are selected. Then, the output data "c−d" of the memory 131 are output through the input B of the multiplexer 120. The data "a−b−c+d" obtained by subtracting the output data "c−d" of the multiplexer 120 from the output data "a−b" of the memory 231 are output through the input A of the multiplexer 210 and stored in the memory 232. The data "a−b+c−d" obtained by summating the output data "c−d" of the multiplexer 120 and the output data "a−b" of the memory 231 are applied to the output data OUT via the input A of the multiplexer 220. The output data "a+b−c−d" of the memory 232 are stored in the memory 231.

Subsequently, the inputs B and B of the multiplexers 210 and 220 are selected, and the output data "a+b−c−d" of the memory 231 are applied to the output data OUT via the input B of the multiplexer 220. The output data "a−b−c+d" of the memory 232 are stored in the memory 231.

The inputs B and B of the multiplexers 210 and 220 are selected, and the output data "a−b−c+d" of the memory 231 are applied to the output data OUT via the input B of the multiplexer 220.

In this way, the input signal having data "a", "b", "c", and "d" in sequence are converted to the output signal as given by the following Equation 12. Namely, the apparatus according to the first embodiment of the present invention can perform the calculation of the Equation 8 and FIG. 1 using the input signals by the method illustrated in FIGS. 3 and 4.

$$\begin{bmatrix} a+b+c+d \\ a-b+c-d \\ a+b-c-d \\ a-b-c+d \end{bmatrix} = \begin{bmatrix} 1 & 1 & 1 & 1 \\ 1 & -1 & 1 & -1 \\ 1 & 1 & -1 & -1 \\ 1 & -1 & -1 & 1 \end{bmatrix} \begin{bmatrix} a \\ b \\ c \\ d \end{bmatrix} \quad \text{[Equation 12]}$$

The FFT method of the apparatus of FIG. 3 will now be described with reference to FIG. 5. As described previously, in the FFT process, the order bits of data in the input signal are rearranged in the reverse order and fed to the apparatus of FIG. 3. The change in the order of data can be achieved simply by processing the input signal through an input buffer prior to the receiver. Referring to FIG. 5, the input signal having data x(0), x(1), x(2), and x(3) in sequence is changed in the order of data, switching the second data "01" and the third data "10", and therefore fed to the receiver in the order of x(0), x(2), x(1) and x(3). In the same manner as described in FIG. 4, for the multiplexers 110 and 120 and the multiplexers 210 and 220, the inputs A and A are selected when the selection signals $SEl_0$ and $SEL_1$ are "high", whereas the inputs B and B are selected when the selection signals $SEl_0$ and $SEL_1$ are "low".

First, the input signal IN having data x(0) is fed to the first signal processor 100. The input B of the multiplexer 110 is selected, and the data x(0) are stored in the memory 131.

The input signal IN is then for data x(2). The inputs A and A of the multiplexers 110 and 120 and the inputs B and B of the multiplexers 210 and 220 are selected. Both the phase coefficients $W_0$ and $W_1$ are set to $W^0$, i.e., 1. In the same manner as described in FIG. 4, the output data x(0)+x(2) of the adder 150 are output via the input A of the multiplexer 120, and the output data x(0)-x(2) of the subtractor 140 are output via the input A of the multiplexer 110 and stored in the memory 131. The output data x(0)+x(2) of the multiplexer 120 are stored in the memory 232 via the input B of the multiplexer 210.

Subsequently, the input signal IN is for data x(1). The inputs B and B of the multiplexers 110 and 120 and the inputs B and B of the multiplexers 210 and 220 are selected. Both the phase coefficients $W_0$ and $W_1$ are set to 1 (=$W^0$). In the same manner as described in FIG. 4, the output data x(0)-x(2) of the memory 131 are output via the multiplexer 120, and the input data x(1) are stored in the memory 131 via the multiplexer 110. The output data x(0)+x(2) of the memory 232 are stored in the memory 231, and the output data x(0)-x(2) of the multiplexer 120 are output through the multiplexer 210 and stored in the memory 232.

The input signal IN is for data x(3). The inputs A and A of the multiplexers 110 and 120 and the inputs A and A of the multiplexers 210 and 220 are selected. The phase coefficients $W_0$ and $W_1$ are set to $W^1$ and 1 (=$W^0$), respectively. Then, the data x(1)+x(3), obtained by summating the input data x(3) and the output data x(1) of the memory 131, are output through the input A of the multiplexer 120. The data x(1)$W^1$-x(3)$W^1$, obtained by multiplying the output data x(1) of the memory 131 minus the input data x(3) by the phase coefficient $W^1$, are output through the input A of the multiplexer 110 and stored in the memory 131. The data x(0)+x(2)-x(1)-x(3), obtained by subtracting the output data x(1)+x(3) of the multiplexer 120 from the output data x(0)+x(2) of the memory 231, are stored in the memory 232 via the input A of the multiplexer 210. The data x(0)+x(2)+x(1)+x(3), obtained by summating the output data x(1)+x(3) of the multiplexer 120 and the output data x(0)+x(2) of the memory 231, are applied to the output data OUT via the input A of the multiplexer 220. The output data x(0)-x(2) of the memory 232 are stored in the memory 231.

The inputs B and B of the multiplexers 110 and 120 and the inputs A and A of the multiplexers 210 and 220 are selected, and the phase coefficients $W_0$ and $W_1$ are set to $W^1$ and 1 (=$W^0$), respectively. The multiplication by phase coefficient $W_0$ is meaningless, because the input B of the multiplexer 110 is selected. And, the same procedure as described in FIG. 4 is performed with the phase coefficient $W_1$ of 1. Hence, the output data x(1)$W^1$-x(3)$W^1$ of the memory 131 are output through the multiplexer 120, and the output data x(0)-x(2)-x(1)$W^1$+x(3)$W^1$ of the subtractor 240 are output through the multiplexer 210 and stored in the memory 232. The output data x(0)-x(2)+x(1)$W^1$-x(3)$W^1$ of the adder 250 are applied to the output data OUT via the multiplexer 220. The output data x(0)+x(2)-x(1)-x(3) of the memory 232 are stored in the memory 231.

Subsequently, the inputs B and B of the multiplexers 210 and 220 are selected, making multiplications of the multipliers 160 and 260 meaningless, so the same procedure as described in FIG. 4 is performed. The output data x(0)+x(2)-x(1)-x(3) of the memory 231 are applied to the output data OUT through the multiplexer 220. The output data x(0)-x(2)-x(1)$W^1$+x(3)$W^1$ of the memory 232 are stored in the memory 231.

The inputs B and B of the multiplexers 210 and 220 are selected, and the same procedure as described in FIG. 4 is performed. The output data x(0)+x(2)-x(1)-x(3) of the memory 231 becomes the output data OUT through the multiplexer 220, and the output data x(0)-x(2)-x(1)$W^1$+x(3)$W^1$ of the memory 232 are stored in the memory 231.

In this way, the input signal having data x(0), x(1), x(2) and x(3) in sequence is converted to the output signal according to the following Equation 13. When replacing N with 4 in the Equation 11 representing the FFT signal processing for an input signal having N data, $W_4^0$, $W_4^1$, $W_4^2$ and $W_4^3$ correspond to 1, $W^1$, -1, and -$W^1$, respectively, making the results of the Equation 13 same as those of the Equation 11. Namely, the apparatus according to the first embodiment of the present invention can perform the calculations of the Equation 11 and FIG. 2 for the input signal according to the method as described in FIGS. 3 and 5, i.e., by the FFT process.

$X(0)=x(0)+x(2)+x(1)+x(3)$ $X(1)=x(0)-x(2)+x(1)W^1-x(3)W^1$ $X(2)=x(0)+x(2)-x(1)-x(3)$ $X(3)=x(0)-x(2)-x(1)W^1+x(3)W^1$ [Equation 13]

As described above, the apparatus according to the first embodiment of the present invention performs both FTH and FFT by selection of the phase coefficients $W_0$ and $W_1$.

Next, reference will be made to FIGS. 6 and 7 to describe the case where the input signal ratio is increased twofold, i.e., there are two signal sets to be processed simultaneously.

Figure 6:
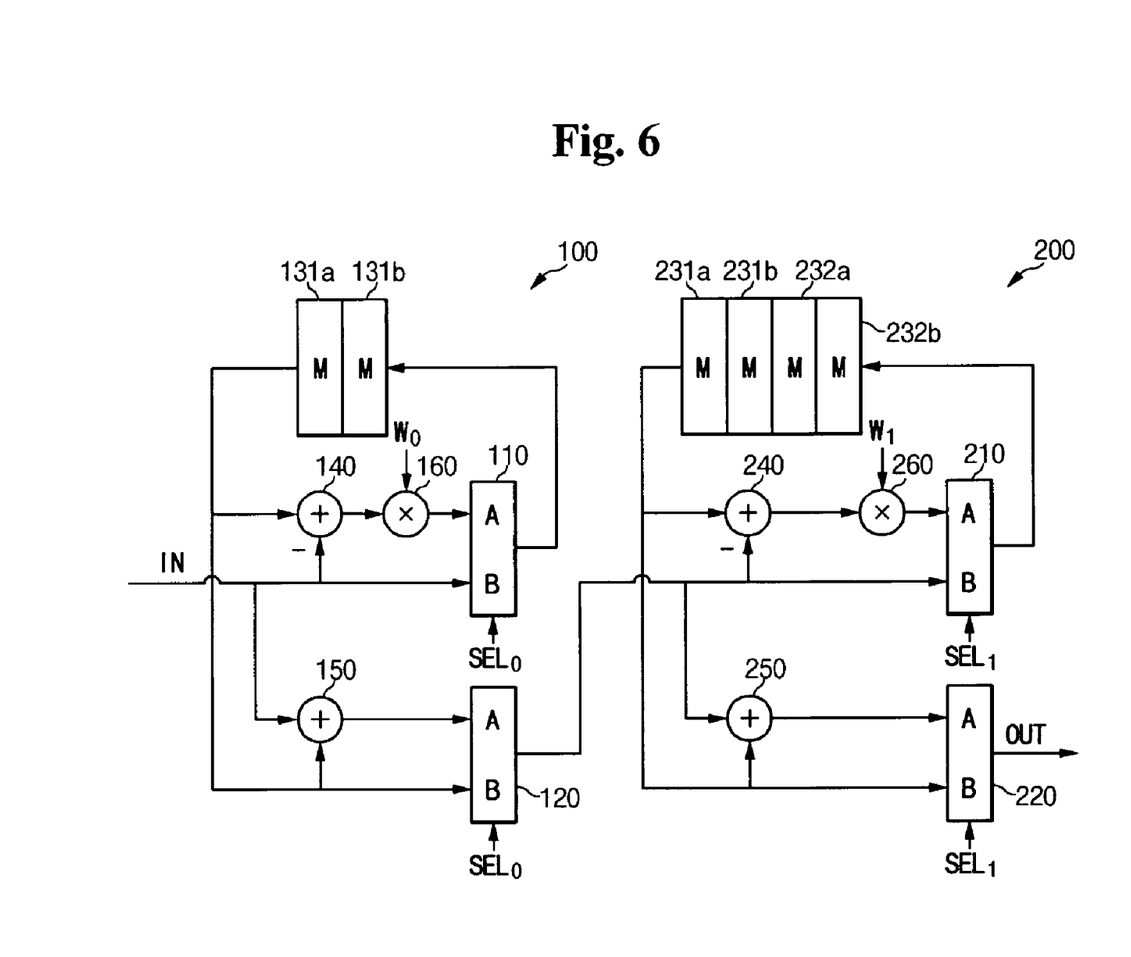
FIG. 6 is a schematic of an apparatus for selectively performing FHT or FFT according to a second embodiment of the present invention.
Figure 7:
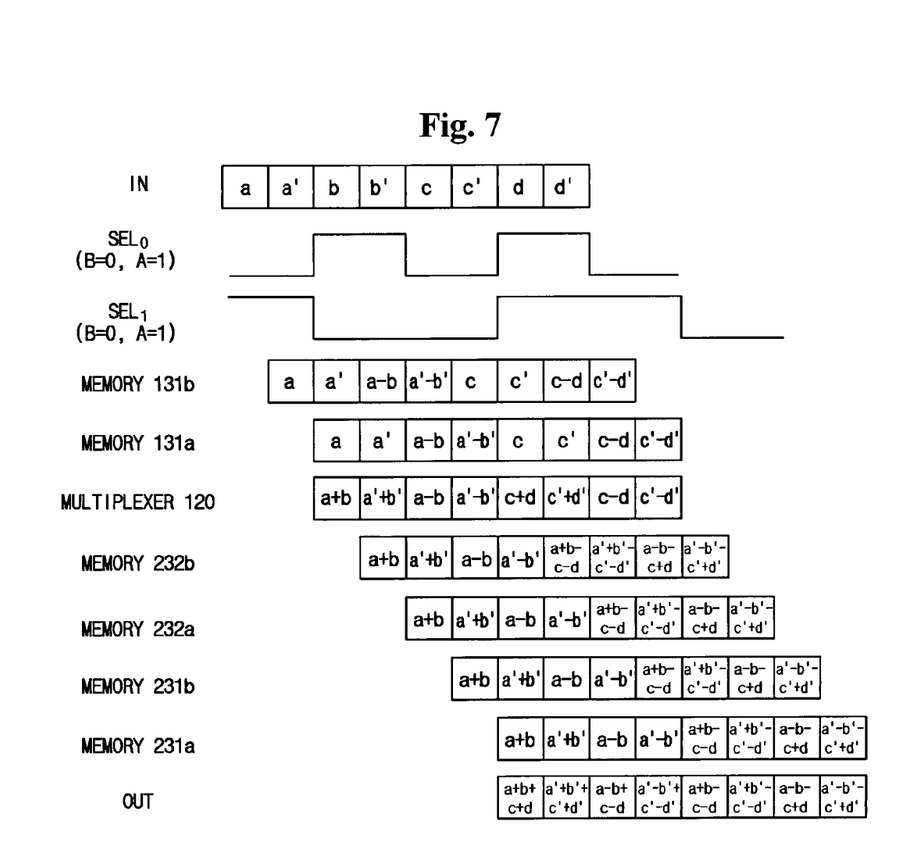
FIG. 7 is a waveform diagram in the FHT process of the apparatus of FIG. 6.

FIG. 6 is a schematic of an apparatus for selectively performing FHT or FFT according to a second embodiment of the present invention, and FIG. 7 is a waveform diagram in the FHT process of the apparatus of FIG. 6.

As illustrated in FIG. 6, the number of memories in the apparatus is increased twofold for the doubled input signal ratio. More specifically, referring to FIG. 6, the apparatus according to the second embodiment of the present invention has twice the number of memories 131*a* and 131*b* of the first signal processor 100 and twice the number of memories 231*a*, 231b, 232a and 232b of the second signal processor 200 relative to the apparatus of the first embodiment. The receiver according to the second embodiment has the same structure of the receiver according to the first embodiment except for the memories.

The FHT method of the apparatus of FIG. 6 will be described below with reference to FIG. 7. In this case, the phase coefficients $W_0$ and $W_1$ are constantly "1" as described in FIG. 4. In FIG. 6, the input signal has data a, b, c, d, a', b', c' and d' in sequence and fed to the receiver in the order of a, a', b, b', c, c', d and d'. For each of the multiplexers 110, 120, 210 and 220, input A is selected when the selection signal is "high", and input B is selected when the selection signal is "low". The operation of the apparatus of FIG. 6 according to the signal timing of FIG. 7 is readily understandable from the above description and will now be described briefly in the aspect of input/output.

The data "a", once entered, are stored in the memory 131b via the input A of the multiplexer 110. The data "a'", once entered, are stored in the memory 131b, and the data "a" stored in the memory 131b are transferred to the memory 131a.

Once the data "b" are entered, the data "a−b" obtained by subtracting the input data "b" from the output data "a" of the memory 131a are stored in the memory 131b via the input A of the multiplexer 110. The data "a'" stored in the memory 131b are transferred to the memory 131a. The data "a+b" from the adder 150 are stored in the memory 232b via the input A of the multiplexer 120 and the input B of the multiplexer 210. Once the data "b'" are entered, the data "a'−b'" obtained by subtracting the input data "b'" from the output data "a'" of the memory 131a are stored in the memory 131b via the input A of the multiplexer 110. The data "a−b" stored in the memory 131b are transferred to the memory 131a. The data "a'+b'" from the adder 150 are stored in the memory 232b via the input A of the multiplexer 120 and the input B of the multiplexer 210. The data "a+b" stored in the memory 232b are transferred to the memory 232a.

The data "c", once entered, are stored in the memory 131b via the input A of the multiplexer 110. The data "a'−b'" of the memory 131b is stored in the memory 131a. The data "a−b" of the memory 131a is stored in the memory 232b via the inputs B and B of the multiplexers 120 and 210. The data "a'+b'" and "a+b" are stored in the memories 232a and 231b, respectively. Subsequently, the data "c'", once entered, are stored in the memory 131b via the input A of the multiplexer 110. The data "c" of the memory 131b is stored in the memory 131a. The data "a'−b'" of the memory 131a is stored in the memory 232b via the inputs B and B of the multiplexers 120 and 210. The data "a−b", "a'+b'" and "a+b" are stored in the memories 232a, 231b and 231a, respectively.

The data "d", once entered, pass through the subtractor 140 and the input A of the multiplexer 110, so the data "c−d" are stored in the memory 131b. The data "c'" are stored in the memory 131a. The data "a+b+c+d", converted from the data "c" of the memory 131a via the adder 150, the input A of the multiplexer 120 and the adder 250, become the output data OUT via the input A of the multiplexer 220. The data "a+b−c−d", converted from the data "c" of the memory 131a via the adder 150, the input A of the multiplexer 120, the subtractor 240 and the input A of the multiplexer 210, are stored in the memory 232b. The data "a−b", "a'−b'" and "a'+b'" are stored in the memories 232a, 231b and 231a, respectively. The data "d'", once entered, pass through the subtractor 140 and the input A of the multiplexer 110, so the data "c'−d'" are stored in the memory 131b. The data "c−d" are stored in the memory 131a. The data "a'+b'+c'+d'", converted from the data "c'" of the memory 131a via the adder 150, the input A of the multiplexer 120 and the adder 250, become the output data OUT via the input A of the multiplexer 220. The data "a'+b'−c'−d'", converted from the data "c'" of the memory 131a via the adder 150, the input A of the multiplexer 120, the subtractor 240 and the input A of the multiplexer 210, are stored in the memory 232b. The data "a+b−c−d", "a'+b'" and "a−b" are stored in the memories 232a, 231b and 231a, respectively.

The data "a−b+c−d", converted from the output data "c−d" of the memory 131a via the input B of the multiplexer 120, the adder 250 and the input A of the multiplexer 220, are applied to the output data OUT. The data "a−b−c+d", converted from the output data "c−d" of the memory 131a via the input B of the multiplexer 120 and the subtractor 240, are stored in the memory 232b via the input A of the multiplexer 220. The data "a'+b'−c'−d'", "a+b−c−d" and "a'−b'" are stored in the memories 232a, 231b and 231a, respectively. The data "c'−d'" of the memory 131b are stored in the memory 131a.

Subsequently, the data "a'−b'+c'−d'", converted from the output data "c'−d'" of the memory 131a via the input B of the multiplexer 120, the adder 250 and the input A of the multiplexer 220, are applied to the output data OUT. The data "a'−b'−c'+d'", converted from the output data "c'−d'" of the memory 131a via the input B of the multiplexer 120 and the subtractor 240, are stored in the memory 232b via the input A of the multiplexer 220. The data "a−b−c+d", "a'+b'−c'−d'" and "a+b−c−d" are stored in the memories 232a, 231b and 231a, respectively.

The output data "a+b−c−d" of the memory 231a are applied to the output data OUT via the input B of the multiplexer 220. The data "a'−b'−c'+d'", "a−b−c+d" and "a'+b'−c'−d'" are stored in the memories 232a, 231b and 231a, respectively. Subsequently, the output data "a'+b'−c'−d'" of the memory 231a are applied to the output data OUT via the input B of the multiplexer 220. The data "a'−b'−c'+d'" and "a−b−c+d" are stored in the memories 231b and 231a, respectively.

The output data "a−b−c+d" of the memory 231a are applied to the output data OUT via the input B of the multiplexer 220. The data "a'−b'−c'+d'" are stored in the memory 231a. Then, the output data "a'−b'−c'+d'" of the memory 231a are applied to the output data OUT via the input B of the multiplexer 220.

In this way, four output data "a+b+c+d", "a−b+c−d", "a+b−c−d" and "a−b−c+d" and four output data "a'+b'+c'+d'", "a'−b'+c'−d'", "a'+b'−c'−d'" and "a'−b'−c'+d'" are generated. Namely, this process enables the processing of twofold input data to double the speed of the FHT signal processing. The receiver of FIG. 6 is also applicable to FFT, and in the same principle, the speed of the FFT signal processing can be doubled. The FFT signal processing is readily understandable from the above description and will not be described any more. Likewise, when the number of signal sets to be processed simultaneously is k, the number of memories in the first signal processor 100 is k and that in the second signal processor 200 is 2k.

Although the above description has been given as to the case of $2^2(=4)$-order conversion, the present invention is not specifically limited to that case and may be applicable to the case of $2^n$-order conversion, which embodiments will be described below with reference to FIGS. 8 and 9.

Figure 8:
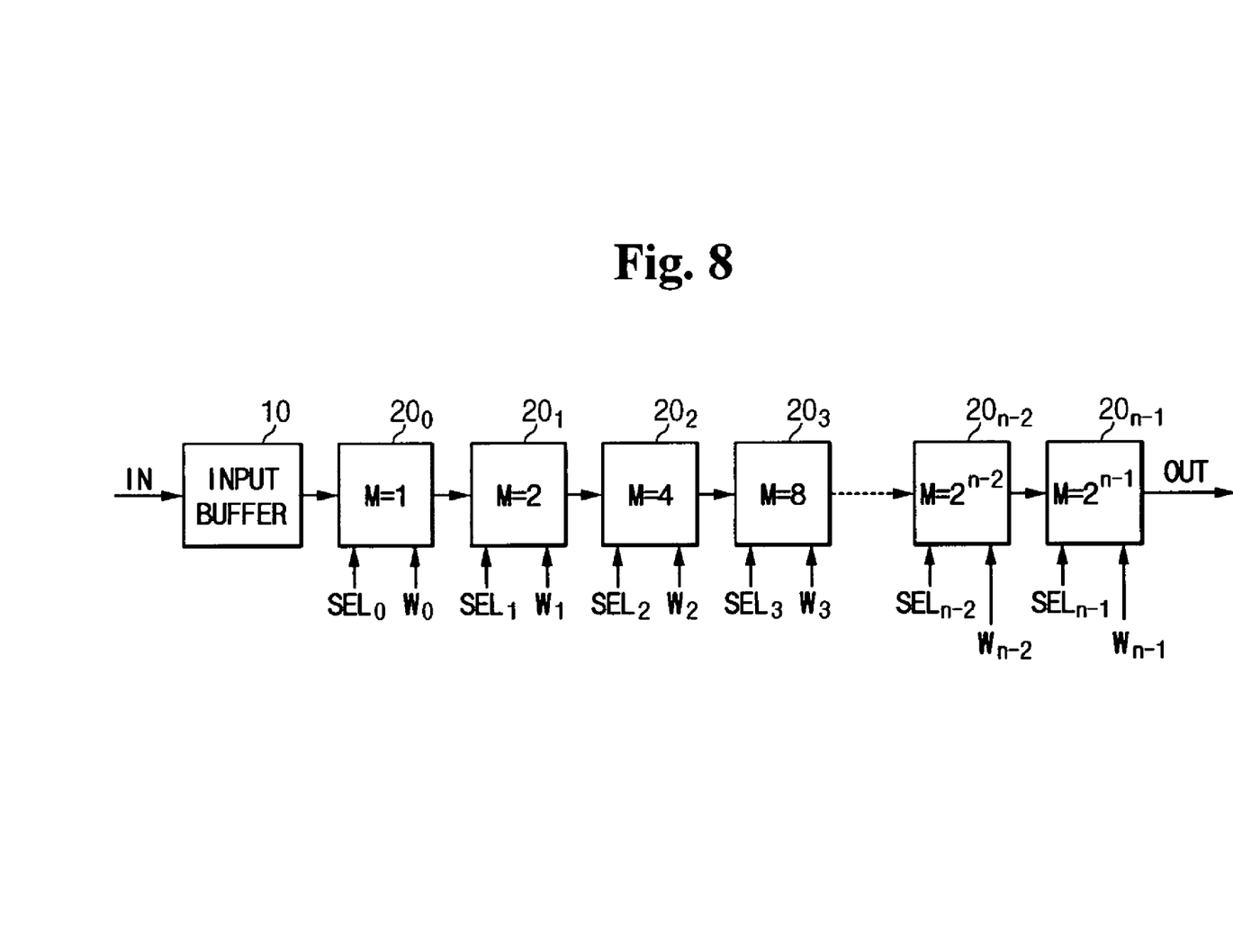
FIG. 8 is a schematic diagram of an apparatus for selectively performing FHT or FFT according to a third embodiment of the present invention.
Figure 9:
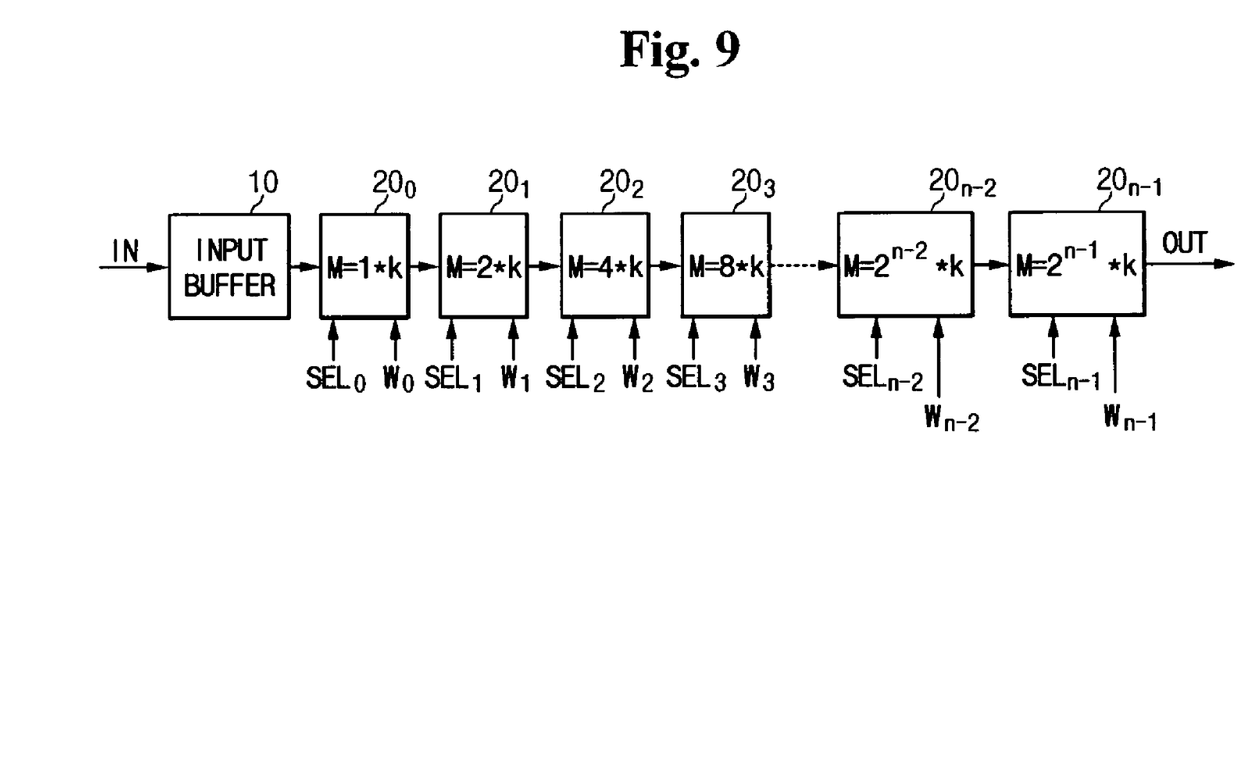
FIG. 9 is a schematic diagram of an apparatus for selectively performing FHT or FFT according to a fourth embodiment of the present invention.

FIG. 8 is a schematic diagram of an apparatus for selectively performing FHT or FFT according to a third embodiment of the present invention, and FIG. 9 is a schematic diagram of an apparatus for selectively performing FHT or FFT according to a fourth embodiment of the present invention.

The apparatus according to the third embodiment of the present invention comprises, as shown in FIG. 8, an input buffer 10, and n signal processors $20_0$ to $20_{n-1}$. The input buffer 10 outputs the input signal in the original order when the apparatus performs FHT. But, the input buffer 10 outputs input signal in a changed order when the apparatus performs FFT. Here, the order of the input signal is changed to the reverse order of bits, as described previously.

Among the signal processors $20_0$ to $20_{n-1}$, the signal processor $20_0$ is located at the first stage from the input buffer 10, and the signal processor $20_1$ is located at the second stage from the input buffer 10 to receive the outputs of the signal processor $20_0$. Likewise, the signal processor $20_{n-1}$ is located at the n-th stage from the input buffer 10 to receive the outputs of the signal processor $20_{n-2}$.

Each of the signal processors $20_0$ to $20_{n-1}$ comprises, as illustrated in FIG. 3, two demultiplexers, at least one memory, a subtractor, an adder, and a multiplier. The signal processor $20_0$ generates a 2-order output signal (the output signal given as the sum of two input data) from an input signal IN, and has the same construction of the first signal processor 100 of FIG. 3. The signal processor $20_1$ processes the output signal of the signal processor $20_0$ in the same manner as the second signal processor 200 of FIG. 3 to generate a 4-order output signal (the output signal given as the sum of four input data) from the input signal IN, and has the same construction of the second signal processor 200. Likewise, the signal processor $20_{n-1}$ processes the output signal of the signal processor $20_{n-2}$ to generate a $2^n$-order output signal from the input signal IN and has the same construction of the first and second signal processors 100 and 200 except for the number of memories. The signal processor $20_{n-1}$ needs M ($=2^{n-1}$) memories for $2^n$-order signal processing.

Selection signals $SEL_0$ to $SEL_{n-1}$, are applied to the demultiplexers of the signal processors $20_0$ to $20_{n-1}$, respectively. The selection signal $SEL_0$ switches between "high" and "low" levels whenever the data of the input signal change, as illustrated in FIG. 4. The selection signal $SEL_1$ has a doubled period of the selection signal $SEL_0$. Likewise, the selection signal $SELN_{n-1}$ has a doubled period of the selection signal $SEL_{n-2}$. Accordingly, the selection signal $SEL_{n-1}$ has a $2^{n-1}$-fold period of the selection signal $SEL_0$. In other words, the selection signal $SEL_0$ of the signal processor $20_0$ having one memory is converted in synchronization with one input data, and the selection signal $SEL_i$ of the signal processor $20_i$ having $2^i$ memories is converted in synchronization with $2^i$ input data.

Phase coefficients $W_0$ to $W_{n-1}$ are applied to the multipliers of the signal processors $20_0$ to $20_{n-1}$, respectively. For the FHT signal processing by the receiver of FIG. 8, all the phase coefficients $W_0$ to $W_{n-1}$ are constantly "1". For the FFT signal processing of the receiver, each phase coefficient has a value given by the pattern of FIG. 2. In this manner, the receiver of FIG. 8 can selectively perform $2^n$-order FHT/FFT signal processing by the determination of the phase coefficients $W_0$ to $W_{n-1}$.

Next, reference will be made to FIG. 9 to describe an apparatus for $2^n$-order signal processing when the number of signal sets to be processed simultaneously is k, as illustrated in FIGS. 6 and 7.

Relative to the case of processing one signal set, the number of memories is increased k times when k signal sets are processed simultaneously as described in FIGS. 6 and 7. As illustrated in FIG. 9, the number M of memories for each of the signal processors $20_0$ to $20_{n-1}$ is k times the number of memories for the receiver of FIG. 8. Namely, the number M of memories of the signal processor $20_0$ is k, and the number M of memories of the signal processor $20_1$ is 2k. Likewise, the number M of memories of the signal processor $20_{n-1}$ is $2^{n-1} \cdot k$.

In the above-described embodiment of the present invention, the input buffer 10 outputs the input signal in a changed order in the FFT process but in the original order in the FHT process. In this manner, the output data are provided in the normal order in the FHT process but in a reverse order of bits in the FFT process. Hence, an output buffer can be added so as to change the order of the output data to the original order. The output buffer changes the order of output data in a reverse order of bits only in the FFT process and makes no change in the order of output data in the FHT process.

Contrarily, the FFT process can be achieved without changing the order of input data, which embodiment will be described below in detail with reference to FIGS. 10 and 11.

Figure 10:
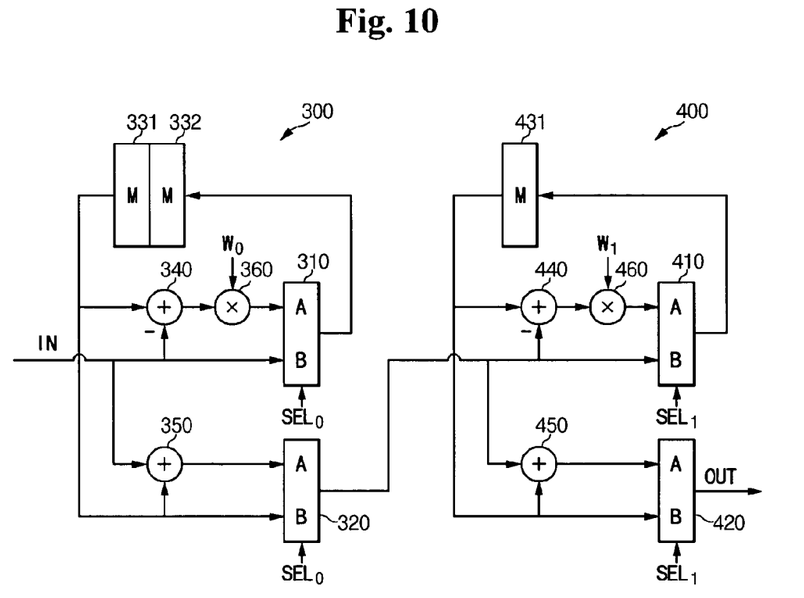
FIG. 10 is a schematic diagram of an apparatus for selectively performing FHT or FFT according to a fifth embodiment of the present invention.
Figure 11:
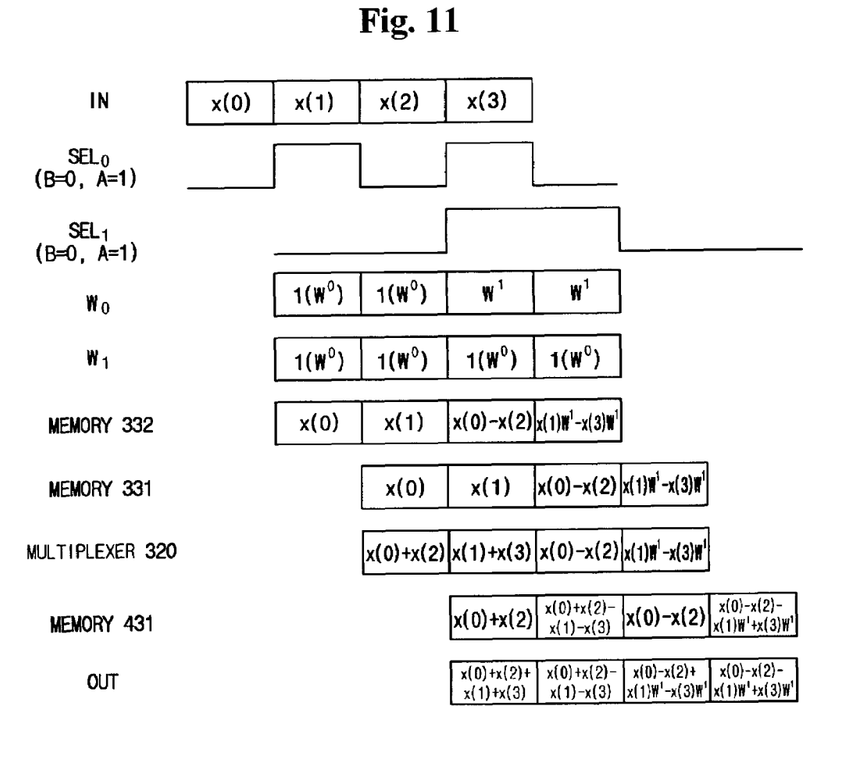
FIG. 11 is a waveform diagram of the FFT process of the apparatus of FIG. 10.

FIG. 10 is a schematic diagram of an apparatus for selectively performing FHT or FFT according to a fifth embodiment of the present invention, and FIG. 11 is a waveform diagram of the FFT process of the apparatus of FIG. 10.

The apparatus for selectively performing FHT or FFT according to the fifth embodiment of the present invention has a different number of memories from the apparatus of FIG. 3. Namely, the apparatus includes two memories 331 and 332 of a first signal processor 300 for performing a 2-order conversion, and one memory 431 of a second signal processor 400 for a 4-order conversion. The rest of the construction and the connections of the first and second signal processors 300 and 400 are the same as those of the first and second signal processors 100 and 200 of FIG. 3, and will not be described in detail.

Contrary to FIG. 5, FIG. 11 shows the input data provided in the original order in the FFT process. As illustrated in FIG. 11, the selection signal $SEL_0$ of the signal processor 300 having two memories is converted in synchronization with two input data, and the selection signal $SEL_1$ of the signal processor 400 having one memory is converted in synchronization with one input data. The operation of the apparatus of FIG. 10 is readily understandable from the above description and FIG. 11 and will not be described in detail.

In this way, the output data are provided in the manner as described in FIG. 2, as illustrated in FIG. 11. Contrary to the apparatus of FIG. 3, the apparatus of FIG. 10 can perform the FFT without changing the order of input data to a reverse order of bits.

According to this embodiment, where the output data are provided in a reverse order of bits in FFT and FHT, the system incapable of processing data in the reverse order of bits has to change the order of the output data to the original order. In this case, an output buffer is provided to change the order of output data to a reverse order of bits.

The apparatus of FIG. 10 is also applicable to the general case of FIGS. 8 and 9. In this case, the number of memories is changed reverse to the number of memories in FIGS. 8 and 9. Namely, the number of memories is provided in a reverse manner to FIGS. 8 and 9. Namely, the numbers of memories for the signal processors $20_0$ to $20_{n-1}$ are respectively $2^{n-1}$, $2^{n-2}$, ..., $2^0$ in FIG. 8, and $2^{n-1} \cdot k$, $2^{n-2} \cdot k$, ..., $2^0 \cdot k$ in FIG. 9. The detailed structure and the operation in this case are readily understandable from the previous embodiments and will not be described in detail.

In the embodiment of the present invention, the memories are used as a delayer for delaying the output data of the multiplexers by a predetermined period, i.e., as long as the number of memories. Accordingly, the apparatus according to the embodiment of the present invention can also be implemented with other delay devices rather than memories.

The multiplication method of phase coefficients provided for FFT in the embodiment of the present invention is an example, and another known multiplication method can also be used.

As described above, the present invention provides a receiver for selectively performing FHT or FFT depending on the selection of phase coefficients. Such a receiver can be used in both CDMA and OFDM mobile communication systems. The receiver, which can receive a plurality of input signal sets simultaneously, classifies the received signals into multi-path signals and multi-antenna signals in the CDMA system, thus processing the multi-path signals separately from the multi-antenna signals, or directly processes multi-path signals and multi-antenna signals in the OFDM system.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. An apparatus for selectively performing FHT (Fast Hadamard Transform) or FFT (Fast Fourier Transform), which apparatus includes at least one memory, the apparatus comprising:

a subtractor for performing a subtraction of a final output of the memory and input data;

a multiplier for multiplying an output of the subtractor by a phase coefficient;

a first multiplexer for selectivity outputting an output of the multiplier and the input data and storing the output data in the memory;

an adder for performing an addition of the final output of the memory and the input data; and a second multiplexer for selectively outputting an output of the adder or the final output of the memory, wherein the apparatus performs the FHT when the phase coefficient is "1" and the apparatus performs the FFT when the phase coefficient is a coefficient variable depending on a conversion order of the FFT.

2. The apparatus as claimed in claim 1, further comprising:
an input buffer for, when the apparatus performs the FFT, changing an input order of the original input data to a reverse order of bits and outputting the input data in the reverse order of bits.

3. The apparatus as claimed in claim 2, further comprising:
an output buffer for, when the apparatus performs the FFT, changing an output order of the output data to a reverse order of bits and providing the output data in the reverse order of bits.

4. The apparatus as claimed in claim 2, wherein, when the apparatus performs $2^n$ (wherein n is an integer from 1 to N)-order conversion in $2^N$-order conversion, the at least one memory sequentially stores $2^{n-1}$ outputs of the first multiplexer and sequentially outputs the stored data.

5. The apparatus as claimed in claim 2, wherein, when the apparatus performs 2n (wherein n is an integer from 1 to N)-order conversion in $2^N$-order conversion and processes k (wherein k is an integer from 1) sets of input data simultaneously, the at least one memory sequentially stores $2^{n-1}.k$ outputs of the first multiplexer and sequentially outputs the stored data.

6. The apparatus as claimed in claim 5, wherein each input data in the input data sets to be processed simultaneously are sequentially input and sequentially stored in the memory.

7. The apparatus as claimed in claim 5, wherein in response to a first selection signal, the first multiplexer outputs the input data and the second multiplexer outputs the final output of the memory, in response to a second selection signal, the first multiplexer outputting the output of the multiplier, the second multiplexer outputting the output of the adder, the first and second selection signals being transformed in synchronization with k input sets of the $2^{n-1}$ input data.

8. The apparatus as claimed in claim 1, wherein when the apparatus performs the FFT, the input data are input in the same order as an original input order.

9. The apparatus as claimed in claim 8, wherein, when the apparatus performs $2^n$ (wherein n is an integer from 1 to N)-order conversion in $2^N$-order conversion, the at least one memory sequentially stores $2^{N-n}$ outputs of the first multiplexer and sequentially outputs the stored data.

10. The apparatus as claimed in claim 8, wherein, when the apparatus performs $2^n$ (wherein n is an integer from 1 to N)-order conversion in $2^N$-order conversion and processing k (wherein k is an integer from 1) sets of input data simultaneously, the at least one memory sequentially stores $2^{N-n}.k$ outputs of the first multiplexer and sequentially outputs the stored data.

11. The apparatus as claimed in claim 10, wherein each input data in the input data sets to be processed simultaneously are sequentially input and sequentially stored in the memory.

12. The apparatus as claimed in claim 10, wherein in response to a first selection signal, the first multiplexer outputs the input data and the second multiplexer outputs the final output of the memory, in response to a second selection signal, the first multiplexer outputting the output of the multiplier, the second multiplexer outputting the output of the adder, the first and second selection signals being transformed in synchronization with k input sets of the $2^{n-1}$ input data.

13. The apparatus as claimed in claim 8, further comprising:

an output buffer for changing the output order of the output data to a reverse order of bits and outputting the output data in the reverse order of bits.

14. A method for selectively performing FHT (Fast Hadamard Transform) or FFT (Fast Fourier Transform), the method comprising:

(a) receiving input data;

(b) subtracting the input data from delayed data;

(c) multiplying the subtracted data by a phase coefficient;

(d) selecting the input data or the multiplied data;

(e) delaying the selected data by a predetermined period and providing the delayed data;

(f) summating the delayed data and the input data; and (g) selecting either the delayed data or the addition data and providing the selected data as output data, performing the FHT when the phase coefficient is "1", and performing the FFT when the phase coefficient is a coefficient variable depending on a conversion order of the FFT.

15. The method as claimed in claim 14, wherein the step (e) includes:

delaying the selected data by a length corresponding to the k sets of the $2^{n-1}$ input data, when the apparatus performs $2^n$ (wherein n is an integer from 1 to N)-order conversion in $2^N$-order conversion and processes k (wherein k is an integer from 1) sets of input data simultaneously.

16. The method as claimed in claim 15, further comprising: changing the order of the input data to a reverse order of bits, when the apparatus performs the FFT.

17. The method as claimed in claim 14, wherein the step (e) includes:

delaying the selected data by a length corresponding to the k sets of the $2^{N-n}$ input data, when the apparatus performs $2^n$ (wherein n is an integer from 1 to N)-order conversion in $2^N$-order conversion and processes k (wherein k is an integer from 1) sets of input data simultaneously.

* * * * *